Figure 5:
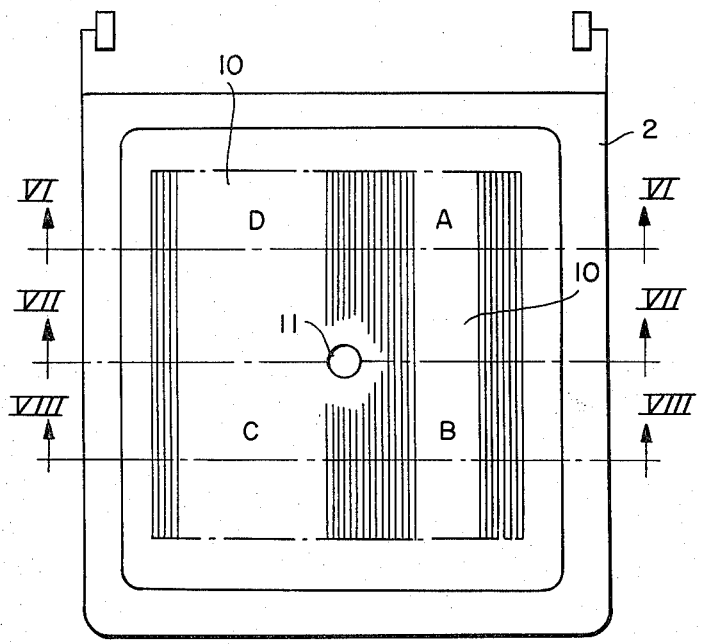

United States Patent [19]

Oelbermann

[11] 4,425,233

[45] Jan. 10, 1984

[54] FILTER PLATE FOR FILTER PRESSES

[75] Inventor: Max Oelbermann, Remscheid, Fed. Rep. of Germany

[73] Assignee: Rittershaus & Blecher GmbH, Wuppertal, Fed. Rep. of Germany

[21] Appl. No.: 383,951

[22] Filed: Jun. 1, 1982

[30] Foreign Application Priority Data

May 30, 1981 [DE] Fed. Rep. of Germany ....... 3121656

[51] Int. Cl.$^3$ ..................... B01D 25/12; B30B 15/06
[52] U.S. Cl. ................................. 210/231; 100/194; 100/295; D23/149
[58] Field of Search ............. 210/224, 227, 228, 229, 210/231; 100/194–206, 295; D7/47; D15/122, 199; D23/4, 149

[56] References Cited

U.S. PATENT DOCUMENTS 2,407,303  9/1946  Teale .................................. 210/229

FOREIGN PATENT DOCUMENTS

| 538380 | 7/1959 | Belgium | 210/231 |
| 52-45775 | 4/1977 | Japan | 210/227 |
| 52-53575 | 4/1977 | Japan | 210/227 |
| 56-13488 | 3/1981 | Japan | 100/194 |
| 998421 | 7/1965 | United Kingdom | 210/231 |

OTHER PUBLICATIONS

*The Shriver Pamphlet*, Filter Presses, General Catalog No. 29, T. Shriver & Co., New Jersey, 1929.
*Arts Chemiques*, III Ser., vol. 22.2, c. 14.5, p. 62, pl. 14, French Filtres-Presses, Par M. Bourdon (location), Dec. 31, 1877.

*Primary Examiner*—Charles N. Hart
*Assistant Examiner*—John W. Czaja
*Attorney, Agent, or Firm*—Antonelli, Terry & Wands

[57] ABSTRACT

The thickness of filter plates is a parameter determining the size of the useful volume of filter presses.

It is desirable to provide a filter plate which can be dimensioned substantially thinner than heretofore and which moreover can be manufactured in supersize dimensions of, for example, an edge length of 3 m×3 m. To provide for high stability and a certain flexibility thereby enabling in a manufacturing of very large filter press plates having relatively thin bottom portions, the bottom portions of the filter plate is divided into at least four quadrants with each of the quadrants including outwardly curved portions, and with the outwardly curved portions of adjacent quadrants being in opposite directions with respect to a center plane of the filter plate.

9 Claims, 10 Drawing Figures

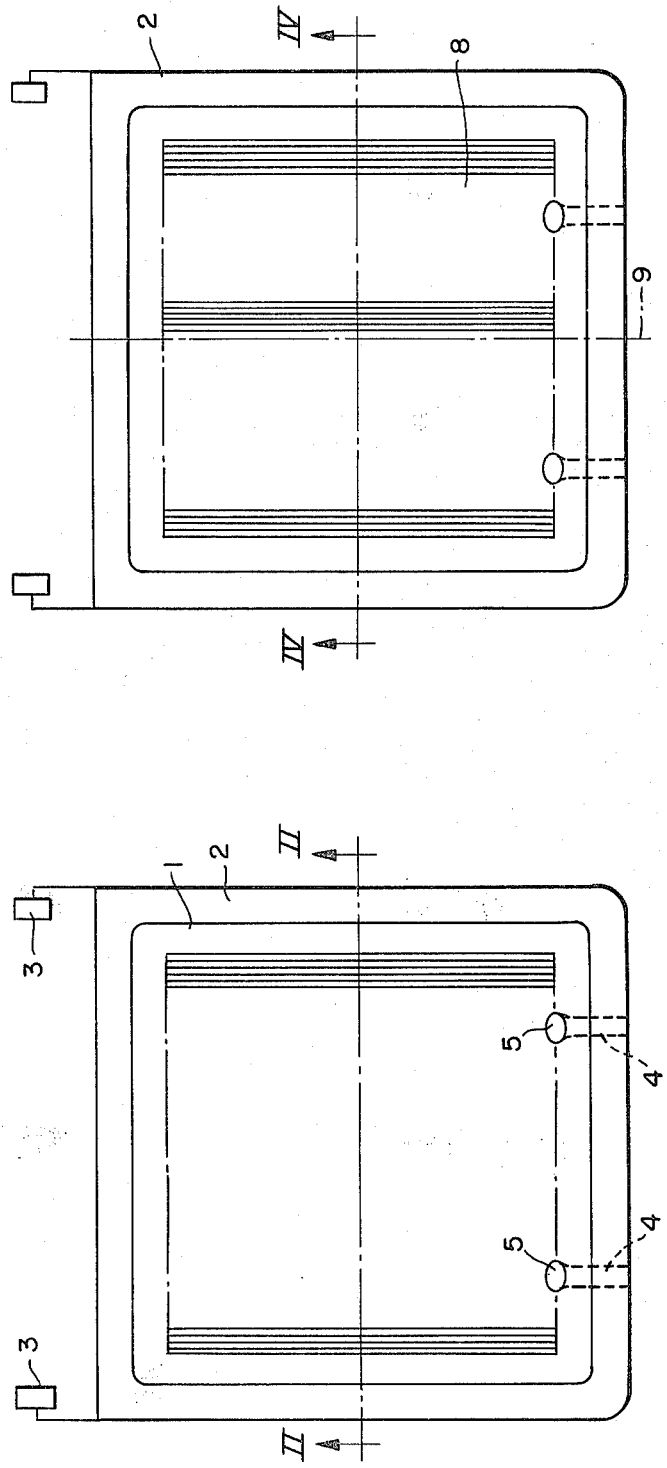

FILTER PLATE FOR FILTER PRESSES

The economy of filter presses greatly depends on the filter area and the chamber volume. The filter area corresponds, in case of chamber filter plates, substantially to the size of the bottom of the chamber, whereas, the chamber volume is determined by the difference in the thickness of the rim and of the chamber bottom. In the conventional chamber filter plates, the thickness of the chamber bottom is about one-third the rim thickness so that in filter presses only about two-thirds of the total length of a filter plate pack is available as chamber spaces and/or filter cake spaces. In view of the high demands for stability resulting from the high filtration pressure, it is impossible in the conventional type of construction of chamber filter plates to enlarge the chamber space by, the example, making the chamber bottom thinner in relation to the rim. It has not been possible heretofore, either, to build chamber filter plates of, for example, an edge length of 3 m×3 m for high-prssure filter presses. The same problems exist also in frame filter plates wherein the chamber space is created by separate frames.

The invention is based on the object of providing a filter plate which can be dimensioned to be thinner than heretofore and which moreover can be manufactured in supersize dimensions of, for example, 3 m×3 m edge length.

In order to attain this object, the invention provides that the central area of the filter plate is curved into two opposed directions. As has been found in extensive studies and tests, a curved filter plate exhibits a higher stability with respect to mechanical and hydraulic pressure loads. Moreover, a curved filter plate is capable of yielding elastically, in a controlled fashion in a predetermined direction, to thermal stresses resulting, for example, from the differing thickness of the frame and/or plate edge and the plate bottom. In this connection, the filter plates can be dimensioned to be substantially thinner than heretofore. For example, in case of chamber filter plates, they can be only one-fourth of the thickness of the surrounding rim. The curved filter plate, due to its curvature, can withstand high filter pressures exerted on its surface, especially since it should be considered that the plates are exposed to the filter pressure on both sides and thus need withstand only a pressure difference in adjacent chamber spaces.

In a further development of the invention, the provision can be made that the plate has the same extent of curvature on both sides of one of its lines of symmetry, in opposite directions. Due to this configuration, the filter plate is, for example, rotationally symmetrical about its vertical axis of symmetry by 180° so that it can be suspended arbitrarily in one or the other turned position in a filter plate pack, without causing any change in the size of the neighboring chamber spaces and/or filter cake spaces.

According to a preferred embodiment, the provision can be made by this invention that the filter plate is curved in its four quadrants alternatingly in opposite directions. Also in this configuration, the filter plate is rotationally symmetrical by 180° about its vertical line of symmetry. By means of this sectoral shape of a higher order of curvature, an especially rugged construction is made possible. Also, each quadrant of the plate can consist of four secondary quadrants with respectively pairwise-opposed direction of curvature.

The filter plate according to this invention is cast, advantageously, for example, from graphitic grey cast iron or nodular iron, or shaped from a synthetic resin. In this connection, it has been found in case of chamber filter plates that, with a curved configuration of the chamber bottom, a relatively large difference in thickness between the rim and the chamber bottom can be provided without the occurrence of fractures or cracks, or warping during the cooling of the cast material. Rather, the thickened rim is shrunk during its retardard cooling onto the chamber bottom, which latter yields in a controlled fashion to the shrinking-on pressure exerted by the rim, thus assuming a curvature. Consequently, it is possible according to the invention to produce, in particular, also chamber filter plates in supersize dimensions.

However, alternatively it is also possible to manufacture the filter plate of this invention by milling.

According to another feature of the invention, the provision can be made that the curved chamber bottom of the filter plate lies within the frame encompassed by the thickened rim. Thereby the suspending of the filter plates and the manipulating of the filter press are simplified.

The invention will be described in greater detail below with reference to several embodiments illustrated in the drawings, using the case of chamber filter plates as an example.

In the drawings

Figure 6:
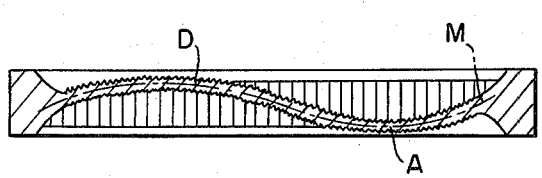
Figure 7:
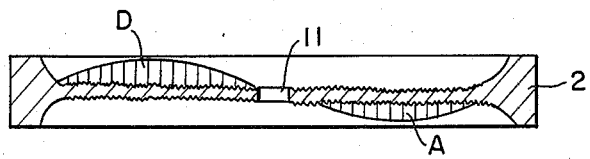
Figure 8:
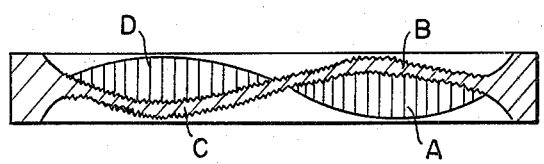
Figure 9:
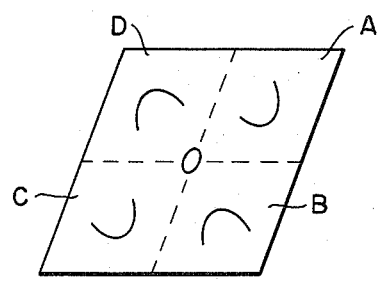

FIG. 1 is a partially schematic top view of a chamber filter plate with a simple curvature, FIG. 2 is a cross-sectional view taken along the line II—II in FIG. 1, FIG. 3 is a top view of one embodiment of a chamber filter plate according to the invention, FIG. 4 is a cross-sectional view taken along the line IV—IV in FIG. 3, FIG. 5 is a schematic top view of a second embodiment of a chamber filter plate in accordance with the present invention, FIGS. 6, 7, and 8 are cross-sectional views taken along lines VI—VI, VII—VII, and VIII—VIII, respectively, in FIG. 5, FIG. 9 is a schematic view of the embodiment of FIGS. 5-8, and FIG. 10 is a schematic view of a third embodiment of a chamber filter plate according to the present invention.

As shown in FIGS. 1 and 2, the chamber filter plate includes a chamber bottom 1, provided with channels on both sides thereof, and a continuously extending, thickened rim 2, the thickness of which is about four to five times that of the chamber bottom 1. The chamber filter plate is suspended at its upper corners by means of casters 3 on guide rails of a filter press (not shown). As is usual, the rim 2 is provided with passage bores 4 and openings 5 terminating into the chamber spaces 6 and 7, respectively, of the plate.

As shown most clearly in FIG. 2, the chamber bottom 1, and, in particular, a central area M, is curved in the manner of a calotte of the first order.

As shown in FIGS. 3 and 4, the chamber bottom 8 is curved into opposed directions on both sides of the vertical line of symmetry 9 of the filter plate, and the filter plate is thus configured to be rotationally symmetrical about the line 9 by 180°.

In FIGS. 5-9, the chamber bottom 10 is curved in its four quadrants A, B, C, D, respectively alternatingly into opposite directions so that a nodal point of the curvatures in the four quadrants A, B, C, D lies in the center of the filter plate. This design is suitable, for example, for chamber filter plates having a central liquid feed such as, for example, a central slurry feed 11.

Figure 10:
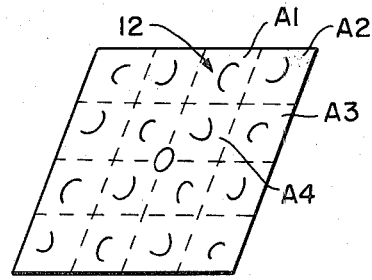

As shown in FIG. 10 each quadrant, for example, quadrant A, of the chamber bottom generally designated by the reference numeral 12 includes four secondary quadrants $A_1$, $A_2$, $A_3$, $A_4$ with diagonally adjacent secondary quadrants in each case being curved in the same direction.

In all the above-described embodiments, the curved chamber bottom 1, 10, 12 remains within the area surrounded by the rim 2.

The invention is not restricted to the illustrated examples. Rather, the invention can also be applied advantageously to frame filter plates wherein the filter plates, instead of exhibiting a molded-on, thickened rim, are associated with separate frames for providing the filter cake chambers.

I claim:

1. Filter plate for filter presses, the filter plate including a continuous rim portion defining an outer periphery of the filter plate and encompassing a space defining a filter area, a chamber bottom portion connected to said continuous rim portion and disposed in the space defining the filter area, the chamber bottom portion including four quadrants with a central area including at least one outwardly curved portion, the curved portions of adjacent quadrants extending in opposite directions outwardly from a center plane of the filter plate such that the filter plate is rotationally symmetrical about a vertical axis of symmetry.

2. A filter plate according to claim 1, wherein the curved portions extend outwardly to the same extent of curvature on both sides of the plane of the filter plate.

3. Filter plate according to claim 1, wherein each quadrant of the filter plate includes four secondary quadrants, and wherein at least one outwardly curved portion is provided in each of the four secondary quadrants, the curved portions of adjacent secondary quadrants extending in opposite directions outwardly from the center plane of the filter plate.

4. Filter plate according to claim 3, wherein a thickness of the chamber bottom portion is about one-fourth a thickness of the rim portion.

5. Filter plate according to claim 4, wherein the filter plate is produced from cast material of one of graphitic grey cast iron, nodular iron, or a synthetic resin.

6. Filter plate according to claim 4, wherein the filter plate is produced by milling.

7. Filter plate according to claim 1, wherein a thickness of the chamber bottom protion is about one-fourth a thickness of the rim portion.

8. Filter plate according to claim 1, wherein the filter plate is produced from cast material of one of graphitic grey cast iron, nodular iron, or a synthetic resin.

9. Filter plate according to claim 1, wherein the filter plate is produced by milling.

* * * * *